Feb. 19, 1963  L. G. SADLER ETAL  3,077,722
HITCH
Filed Feb. 9, 1959  3 Sheets-Sheet 1
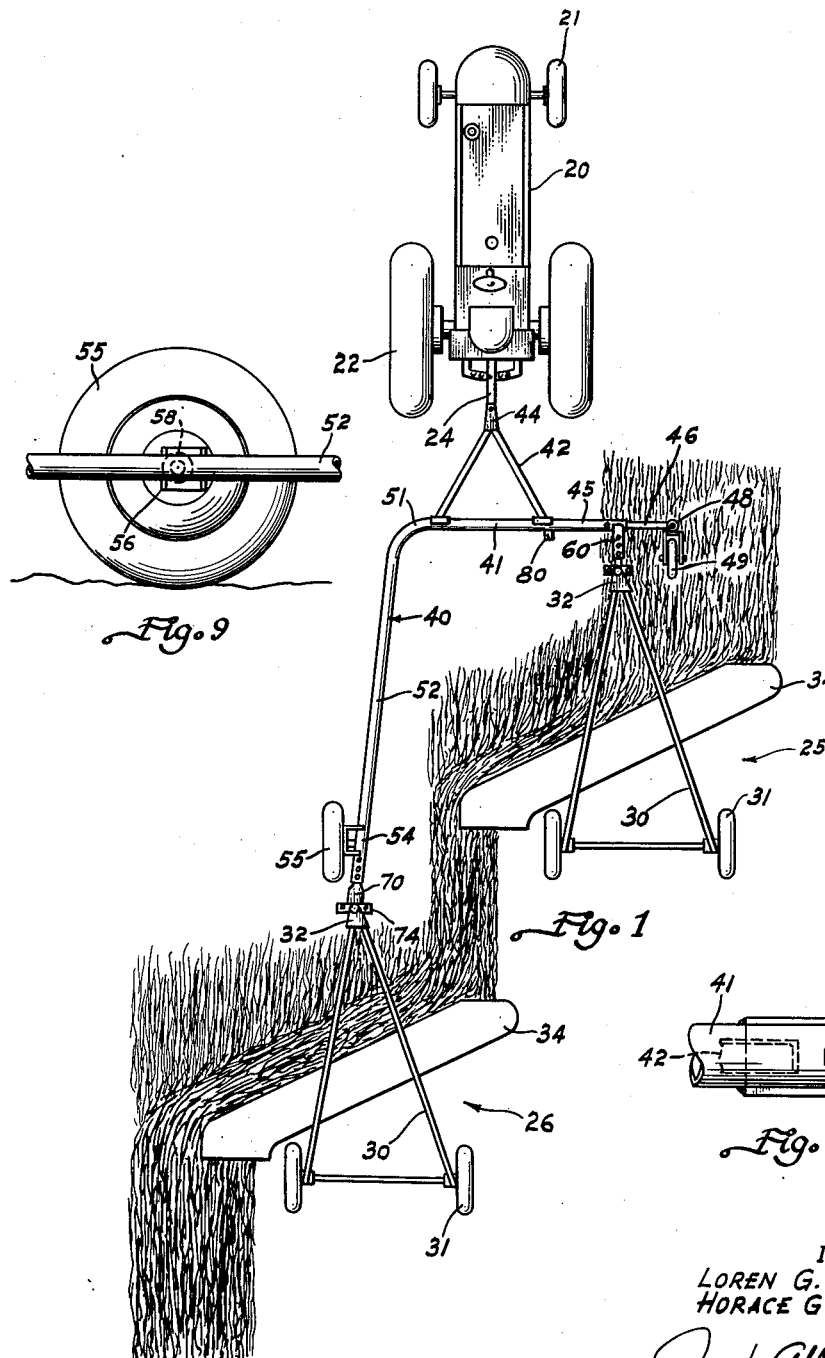
INVENTORS
LOREN G. SADLER &
HORACE G. McCARTY
By Joseph Allen Brown
ATTORNEY

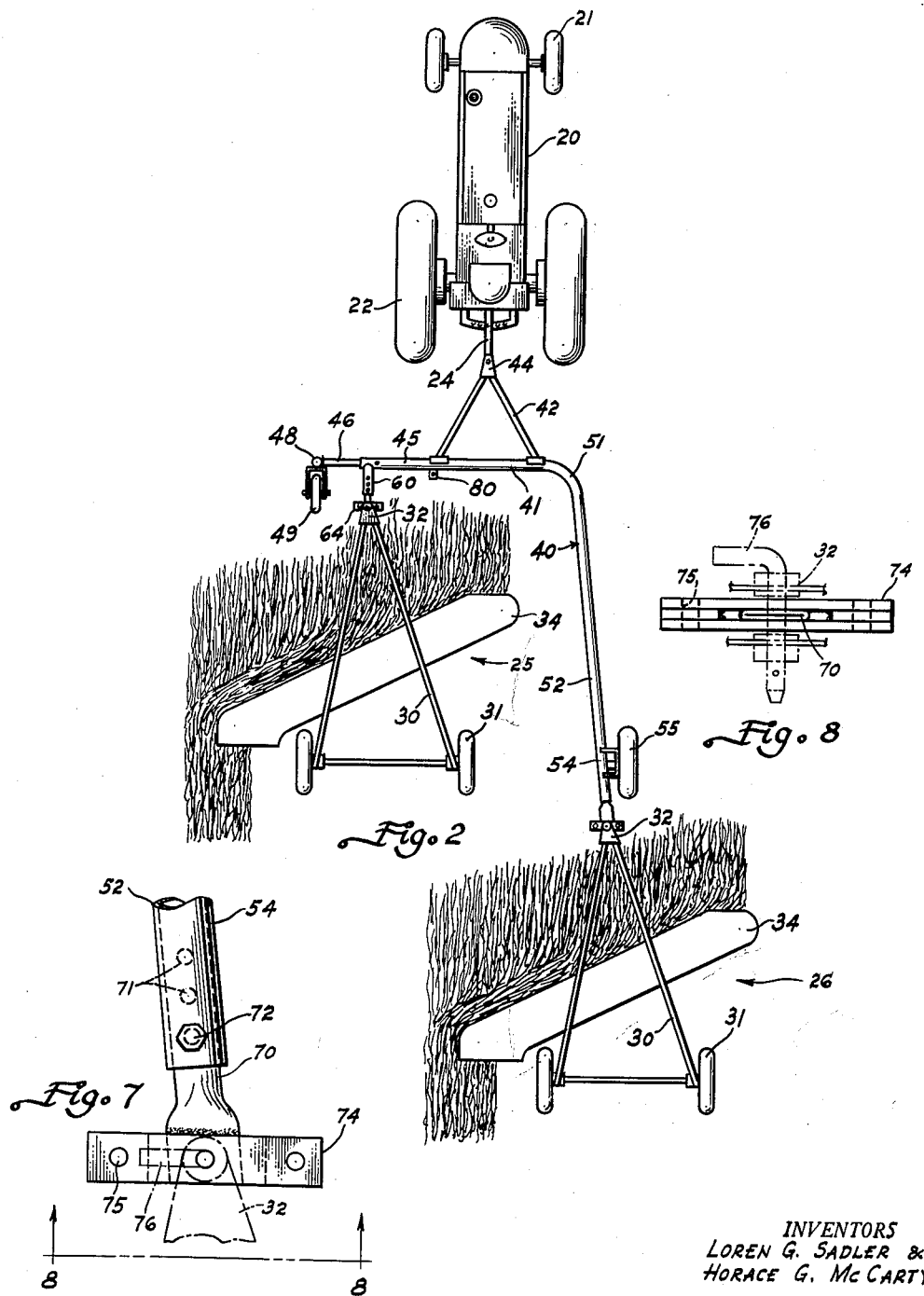

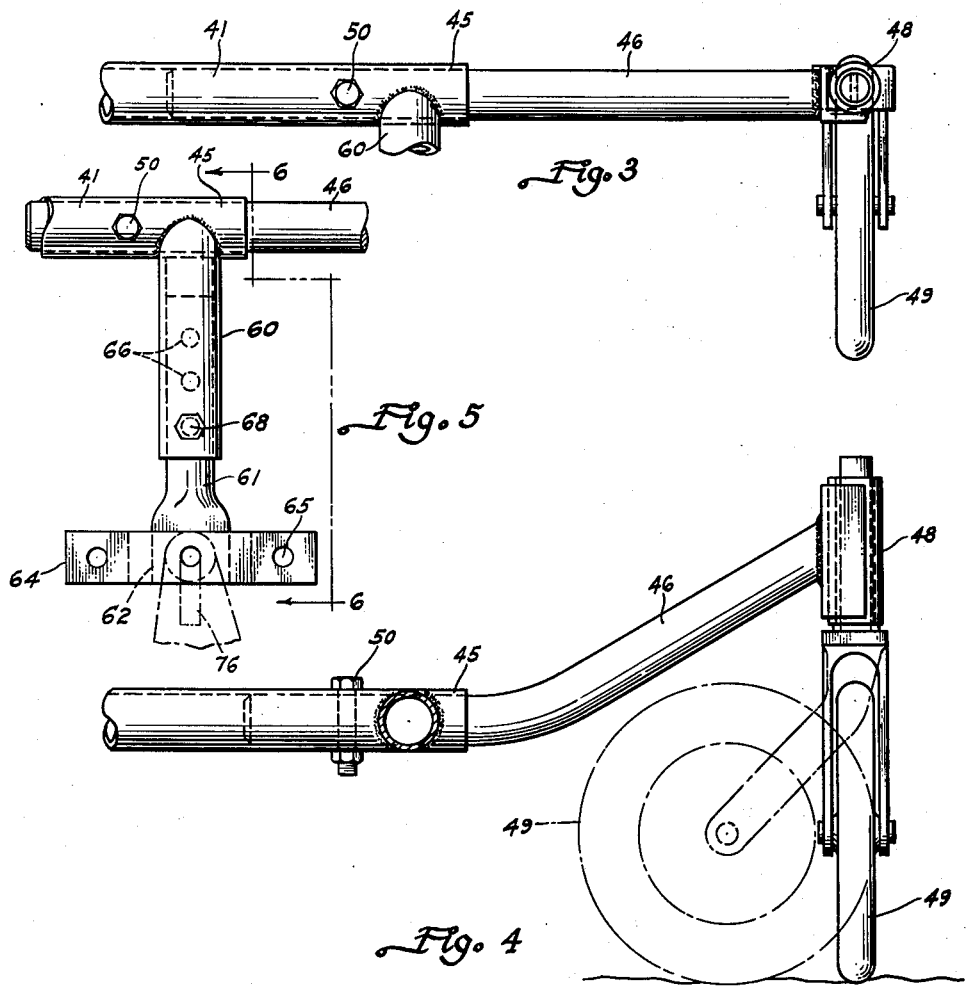

3,077,722
HITCH
Loren G. Sadler, Stevens, and Horace G. McCarty, New Holland, Pa., assignors to Sperry Rand Corporation, New Holland, Pa., a corporation of Delaware
Filed Feb. 9, 1959, Ser. No. 791,956
12 Claims. (Cl. 56—377)

The present invention relates generally to side delivery hay rakes. More particularly, the invention relates to the use of a pair of side delivery rakes at the same time and towed by a single vehicle.

Heretofore, it has been known to provide a pair of side delivery rake baskets on a single frame and towed by a single vehicle. It has also been known to mount these rakes on a frame so that one of the rakes can be shifted relative thereto whereby the pair of rakes may rake separate windrows or combine their discharge into a single, double-sized windrow. Such structures enable an operator to reduce raking time by about one half. However, a frame capable of carrying two rake baskets is cumbersome and expensive. Further, the pair of rakes thereon do not rake as efficiently as two single rakes because they are unable to respond to variations in ground conditions as readily as single, separately operable rakes. Still further, the rake drives are unduly complicated where there are two rakes on one frame, requiring dual power means for at least one of the rakes in the pair to permit driving such one rake in either of two positions.

One object of this invention is to provide means whereby a pair of conventional, ground driven, side delivery hay rakes can be operated together in tandem and towed by a single vehicle.

Another object of this invention is to provide a hitch frame adapted to be connected to a tractor and to which a pair of side delivery rakes can be connected and operated selectively to rake two single size windrows or one double-size windrow.

Another object of this invention is to provide tandem raking wherein a reversible hitch frame is used, the pair of rakes connected to the frame raking two single size windrows when the frame is in one position, and a single double-size windrow when the frame is in another position.

A further object of this invention is to provide a hitch frame adapted to be positioned, selectively, right side up or upside down and having hitch members which remain at the same distance relative to the ground regardless of the position of the frame.

A still further object of this invention is to provide a rake frame which is of relatively simple, inexpensive construction enabling an operator to conveniently use two conventional side delivery rakes at one time to reduce raking time.

Other objects of this invention will be apparent hereinafter from the specification and from the recital in the appended claims.

In the drawings:

FIG. 1 is a plane view showing a tractor towing a pair of side delivery hay rakes, there being interposed between the tractor and the rakes a hitch frame constructed according to this invention. The hitch frame is positioned and the rakes are being operated to rake a single, double-sized windrow;

FIG. 2 is a plan view similar to FIG. 1 but with the hitch frame reversed and turned upside down whereby the side delivery rakes connected thereto rake two single sized windrows;

FIG. 3 is an enlarged plan view of the caster wheel which supports one end of the hitch frame;

FIG. 4 is a rear elevation of FIG. 3;

FIG. 5 is an enlarged plan view of the hitch member for the forward rake, such hitch being longitudinally adjustable and providing means for lateral adjustment of the hitch connection with the rake;

FIG. 6 is a section taken on the lines 6—6 of FIG. 5 looking in the direction of the arrows and showing the details of the hitch structure;

FIG. 7 is an enlarged fragmentary plan view of the hitch employed for the trailing rake, such hitch being similar to that shown in FIG. 5;

FIG. 8 is an end view taken on the line 8—8 of FIG. 7 looking in the direction of the arrows and showing the details of the mounting of the hitch plate;

FIG. 9 is an enlarged side elevation of the fixed wheel supporting a rearward end of the hitch frame; and FIG. 10 is an enlarged rear elevation of the transport hitch member of the hitch frame.

Referring now to the drawings by numerals of reference and particularly to FIGS. 1 and 2, 20 denotes a tractor having a pair of forwardly disposed steerable wheels 21 and a pair of rearward traction wheels 22. The tractor has a rearwardly extending laterally adjustable drawbar 24.

Adapted to be connected to the tractor and drawn in tandem thereby are side delivery hay rakes 25 and 26. The two rakes are of similar construction. Each comprises a support frame 30 supported at its rearward end by laterally spaced ground wheels 31 and at its forward end by a hitch 32. The frame 30 supports a rake basket 34 which extends diagonally relative to the direction of travel of the rake. The rake basket 34 includes raking means driven through a suitable connection with the ground wheels 31. This structure is not shown since it is conventional and plays no part in the present invention. The details of the overall rake structure may be similar to that shown in U.S. Patent No. 2,781,626, issued February 19, 1957.

Rakes 25 and 26 are in all respects conventional ground driven side delivery hay rakes which may be independently operated in normal fashion. When either of the rakes is towed forwardly, the ground wheels are rotated and such rotation is transmitted to the raking reel. The reel rakes the cut hay and conveys and tumbles it diagonally rearwardly for discharge off a trailing end of the rake. The hay is thereby changed from a swath to a loose aerated windrow.

In order that rakes 25 and 26 may be operated at the same time to thereby greatly reduce raking time, a hitch frame 40 constructed according to this invention, is provided. When viewed in plan, the hitch frame is generally L-shaped, having a forward arm 41 which extends transverse to the direction of the travel of the tractor 20. Arm 41 has a forwardly directed V-shaped bracket 42 having a hitch member 44 at its forward end adapted to be connected to the drawbar 24 of the tractor. The connection of the hitch 44 with the drawbar provides a support for the forward end of the hitch frame.

Arm 41 comprises a pipe having a free end 45 which telescopically receives a pipe 46 (FIGS. 3–4) having a swivel connection at its outer end 48 with a caster wheel 49. The pipe 46 is connected to the free end 45 of arm 41 by a bolt 50 which extends through the respective parts as shown in FIG. 4. It will be noted also from FIG. 4 that pipe 46 extends outwardly and then upwardly to provide clearance for the caster wheel whereby there is a clearance between the wheel and pipe 46 regardless of the castered position of the wheel. As shown in dotted lines in FIG. 4, when the caster wheel is pivoted inwardly, there is substantial clearance between the wheel and pipe 46. By removing the bolt 50, the pipe 46 and caster wheel 49 may be readily separated from the hitch frame. Likewise, by inserting the pipe 46 into the arm 41 and then running the bolt 50 through the respective parts, a ready connection can be made.

Connected to the end 51 of arm 41 opposite free end 45 is a fore-and-aft extending leg 52 supported at its rearward end 54 by a fixed ground wheel 55. As shown in FIG. 9, the ground wheel 55 is connected to leg 52 by a bracket 56 and is rotatable on shaft 58 which is medially disposed relative to the top and bottom of leg 52. Since the axis of shaft 58 is located in a horizontal plane in the middle of leg 52, whether the hitch frame 40 is right side up or upside down, the fixed wheel 55 will engage the ground and still support the hitch frame at the same vertical distance relative to the ground.

The hitch member 32 of the side delivery rake 25 is connected to a hitch carried on frame 40 and shown in detail in FIGS. 5 and 6. Such hitch, which comprises a first hitch, includes a rearwardly extending pipe 60 which telescopically receives a pipe 61 flattened at its rearward, outer end 62 and having transverse plate 64 welded to it. Plate 64 has three laterally spaced holes 65 which provide laterally spaced hitch points for the rake 25. Also, the pipe 61 has three holes 66. Pipe 60 has a single bolt hole adapted to receive a bolt 68 for projection through one of the holes 66 in the pipe 61. The longitudinal extension of the hitch can thus be varied by varying the particular hole 66 through which the bolt 68 passes. It will be seen therefore that the rake 25 is connectable to the hitch frame for both longitudinal and lateral adjustment relative thereto.

Rake 26 is connected to the rearward end 54 of the leg 52 of hitch frame 40 through a second hitch connection similar to that employed for hitching the rake 25. As shown in FIG. 7, the end of leg 52 has a pipe 70 projected into it, such pipe having three holes 71. Projectable selectively through one of the holes is a bolt 72 which extends through the leg 52 and pipe 72 to connect the parts. The outer rearward end of pipe 70 is flattened and has a transverse member 74 welded to it. Member 74 has three laterally spaced holes 75 which provides laterally spaced hitch points for the rake 26.

The hitch members 32 at the forward ends of the respective rakes are preferably of the conventional clevis type adapted to straddle their respective hitch members and adapted to be connected thereto by a drop pin 76.

It is important to note, as shown in FIGS. 6 and 8, that the rearwardly extending hitch members on the hitch frame are disposed to provide hitch connections midway between the top and bottom of the hitch frame. In other words, the hitch plates 64 and 74 are positioned in a horizontal plane midway between the top and bottom of the hitch frame whereby whether the hitch frame is right side up or upside down, the hitch members will be positioned at the same distance from the ground.

Connected to arm 41 of the hitch frame is a transport hitch 80 which comprises merely a piece of bar stock welded to the arm in the middle vertical plane thereof and extending rearwardly. The transport hitch is provided with a hole 81 adapted to receive a hitch pin whereby rake 25 can be connected to it. The purpose of the transport hitch 80 can be seen from FIG. 1. When it is desired to merely transport the rakes, the forward rake 25 is connected to the transport hitch 80 instead of the operative hitch plate 64. Thus, the overall width of the train is reduced and the implements take up less room and can pass between a narrower fence opening and the like. When the field to be raked is reached, the rake 25 is shifted from transport hitch 80 to the hitch plate 64.

With the hitch frame disposed as shown in FIG. 1, that is, with the caster wheel 49 to the right and the fixed wheel 55 to the left, the side delivery rakes operate to rake a double-sized single windrow. As the tractor 20 moves along, the forward side delivery rake 25 rakes the hay on the field and conveys it laterally to the left and off the trailing rear end of the rake. The rearward rake 26 is disposed far enough to the right to catch the hay as it comes from the forward rake. The hay from rake 25 joins the hay being raked by rearward rake 26 and the combined mass of material is discharged to the left from the trailing end of rake 26 in a large double-sized windrow. In this manner, an operator can rapidly perform a raking operation and form large double windrows.

In some cases, double-sized windrows are not desired. The crop may be so heavy that to combine the windrows will produce a single combined mass which is too big for ready baling or other harvesting operation. The operator in such a case will desire two single windrows rather than a double one. To accomplish this, using the hitch frame of the present invention, the operator merely has to reverse the hitch frame. If the hitch frame is considered to be right side up as shown in FIG. 1, the operator turns it upside down to the position shown in FIG. 2. The caster wheel 49 is now disposed to the left and the fixed wheel 55 is now disposed to the right. Since the wheel 55 is rotatable about an axis midway between the top and bottom of the hitch frame, it will support the hitch frame properly from the ground even though the frame has been reversed. Likewise, since the rearwardly extending hitch members for the rakes are also positioned in the medial plane of the hitch frame, when the hitch frame is flipped over the hitches remain in the same position relative to the ground. The only structure which has to be changed around is the caster wheel 49. It is necessary that the bolt 50 be removed and the pipe 46 withdrawn and then after the frame is flipped over to re-insert the pipe 46 and again connect the bolt 50. This is required or, otherwise, the caster wheel would be upside down.

With the hitch frame disposed as shown in FIG. 2, the respective side delivery hay rakes rake single windrows, the forward rake 25 no longer discharging its material to the rearward rake 26.

In addition to the hitches and wheel 55 being disposed on the vertical center of the rake frame, it is also necessary that the hitch 44 to the tractor likewise be medially disposed so that when the frame is flipped over it will connect to the tractor without varying the position of the hitch frame from the ground.

It will also be noted that rear wheels 31 of forward rake 25 rotate on an axis aligned with the axis of rotation of wheel 55. This is provided to minimize skidding during the making of a turn. The fore-and-aft adjustability of the forward hitch makes it possible for the operator to be sure that the axis of wheels 31 is closely aligned with the axis of wheel 55. Therefore, even though different makes of side delivery rakes are employed, they can be properly oriented relative to the hitch frame.

The structure just described provides a simple inexpensive means whereby an operator can use two ground driven side delivery hay rakes at the same time and rake a single double-sized windrow or two single windrows. Since the respective rakes are conventional, normally independent rakes, they operate individually and respond independently to variations in ground conditions. Therefore, they do a much better raking job than prior rake structures wherein two rake baskets are carried on a single frame.

The overall cost of the frame is low and easy to assemble and manufacture. Therefore, the ultimate cost to the farmer is low. Nevertheless, it provides him with a means whereby he can greatly reduce field time in raking.

While this invention has been described in connection with a particular embodiment thereof, it will be understood that it is capable of further modification, and this application is intended to cover any variations, adaptations, or uses of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. A hitch device whereby a pair of rakes, each having its own wheel supported frame, may be towed by a single vehicle and operated, selectively, to rake two separate windrows or one double windrow, comprising in combination a frame adapted to be positioned, selectively, rightside up or upside down, means on said frame connecting the frame to said vehicle, a first hitch connected to said frame at one side of the line of draft of said vehicle, a second hitch laterally spaced from said first hitch and connected to said frame at the opposite side of said line of draft, said second hitch being located rearwardly of said first hitch and the lateral spacing between the hitches being such that the swath raked by a rake connected to the first hitch will overlap the swath raked by a rake connected to the second hitch, both of said hitches being fixedly disposed in a medial horizontal plane of said frame, and means supporting said frame whereby said hitches are at substantially the same distance from the ground whether the frame is rightside up or upside down.

2. A hitch device as recited in claim 1 wherein said supporting means comprises a first and a second support wheel, mounted, respectively, adjacent said first hitch and said second hitch.

3. A hitch device as recited in claim 2 wherein said first wheel is castered, and detachable means is provided for connecting it to said frame.

4. A hitch device as recited in claim 2 wherein said second wheel is rotatable about a horizontal axis located in a medial horizontal plane of said frame.

5. A hitch device as recited in claim 4 wherein said second wheel is rotatable about a fixed axis.

6. A hitch device as recited in claim 5 wherein means is provided for adjusting said first hitch in a fore-and-aft direction relative to said frame.

7. A hitch device as recited in claim 1 wherein said frame has a transversely extending forward arm to which said first hitch is connected and a leg extending rearwardly from said arm to which said second hitch is connected.

8. A hitch device as recited in claim 7 wherein said first hitch is connected to said forward arm adjacent one end thereof and said leg is connected to said forward arm at an opposite end thereof.

9. A hitch device as recited in claim 1 wherein said first and second hitches each have a plurality of laterally spaced hitch points.

10. A hitch device as recited in claim 1 wherein each hitch comprises a T-shaped member including a longitudinal section extending fore-and-aft and connected to said frame for fore-and-aft adjustment relative thereto, and including a laterally extending section having a plurality of laterally spaced holes.

11. A hitch device as recited in claim 1 wherein said frame carries a transport hitch between said first and second hitch in a lateral direction, said transport hitch being located in said medial horizontal plane of the frame.

12. In combination, a hitch frame adapted to be connected to a vehicle in trailing relation thereto, a pair of laterally spaced hitch members on said frame and located on opposite sides respectively of the line of draft of the vehicle and being spaced also in a fore-and-aft direction relative to each other, a pair of ground driven independently framed and wheel supported side delivery rake units both of which deliver raked material in the same lateral direction relative to said line of draft, one rake unit being connected to one hitch member and the other connected to the other hitch member whereby one rake is forwardly of the other rake, the hitch members being so laterally spaced that the swaths raked by the rake units overlap and both hitch members being disposed in a medial horizontal plane of the hitch frame, and wheel means supporting said frame for operation selectively rightside up or upside down whereby said rake units may be located relative to each other to rake two separate windrows or one double windrow and locating said hitch members at the same distance from the ground regardless of whether the frame is rightside up or upside down.

References Cited in the file of this patent

UNITED STATES PATENTS

| | | |
|---|---|---|
| 1,291,813 | Engelhardt | Jan. 21, 1919 |
| 1,307,781 | Lawrence | June 24, 1919 |
| 2,265,405 | Strantz | Dec. 9, 1941 |
| 2,430,143 | Rutter | Nov. 4, 1947 |
| 2,515,016 | McClintock | July 11, 1950 |
| 2,532,652 | Wray | Dec. 5, 1950 |
| 2,552,770 | d'Arlenay | May 15, 1951 |
| 2,597,828 | Spurlin | May 20, 1952 |
| 2,618,921 | Riley et al. | Nov. 25, 1952 |
| 2,709,085 | Stueland | May 24, 1955 |
| 2,735,256 | West | Feb. 21, 1956 |
| 2,746,233 | McClelland et al. | May 22, 1956 |
| 2,781,626 | Happe et al. | Feb. 19, 1957 |
| 2,811,009 | Plant | Oct. 29, 1957 |
| 2,896,392 | Van der Lely et al. | July 28, 1959 |
| 2,955,833 | Hyland | Oct. 11, 1960 |

FOREIGN PATENTS

| | | |
|---|---|---|
| 837,779 | Germany | May 2, 1952 |
| 183,982 | Austria | Dec. 10, 1955 |